United States Patent [19]

Yu

[11] Patent Number: 4,563,624
[45] Date of Patent: Jan. 7, 1986

[54] VARIABLE SPEED REFRIGERATION COMPRESSOR

[75] Inventor: Johnny D. Yu, Dayton, Ohio

[73] Assignee: Copeland Corporation, Sidney, Ohio

[21] Appl. No.: 620,117

[22] Filed: Jun. 13, 1984

Related U.S. Application Data

[63] Continuation-in-part of Ser. No. 347,459, Feb. 11, 1982, abandoned.

[51] Int. Cl.$^4$ .......................... G05D 23/08; H02J 9/00
[52] U.S. Cl. ..................................... 318/472; 318/334; 307/64; 361/22; 361/26
[58] Field of Search .................... 361/26, 32, 22; 310/166, 172, 68 R; 318/329, 334, 472, 778; 333/172, 181; 307/64, 68

[56] References Cited

U.S. PATENT DOCUMENTS

| | | | |
|---|---|---|---|
| 2,986,685 | 5/1961 | Epstein | 361/26 X |
| 3,569,753 | 3/1971 | Babikyan | 310/68 |
| 3,753,069 | 8/1973 | Newton | 307/64 X |
| 3,777,240 | 12/1973 | Neill | 310/471 |
| 4,078,192 | 3/1978 | Fultz | 318/314 X |
| 4,219,071 | 8/1980 | Careglio et al. | 318/334 X |
| 4,259,845 | 4/1981 | Norbeck | 318/334 X |
| 4,384,312 | 5/1983 | Fry | 361/32 X |

FOREIGN PATENT DOCUMENTS

| | | | |
|---|---|---|---|
| 2443215 | 3/1976 | Fed. Rep. of Germany | 333/171 |
| 2525138 | 10/1976 | Fed. Rep. of Germany | 307/64 |
| 52-8440 | 1/1977 | Japan | 307/64 |
| 54-102547 | 8/1979 | Japan | 307/64 |
| 55-37876 | 3/1980 | Japan | 310/68 R |
| 57-151275 | 9/1982 | Japan | 307/64 |

OTHER PUBLICATIONS

"LossyLine Absorptive Filters", Product Brochure, Lundy Electronics & Systems, Inc., Glen Head, N.Y., 1966.
"Electronics Letters", vol. 13, No. 22, pp. 683–684, Oct. 27, 1977.

Primary Examiner—Vit W. Miska
Assistant Examiner—Bentsu Ro
Attorney, Agent, or Firm—Harness, Dickey & Pierce

[57] ABSTRACT

A refrigeration compressor is disclosed which includes a compressor means, a two phase motor drivingly connected thereto and an associated power supply operative to convert single phase 60 hertz alternating current to two phase controlled frequency alternating current so as to enable the compressor to be operated from conventional single phase power and at any point within a range of speeds commensurate with the loading thereon. The power supply also includes improved filtering means for each of the output phases of the power supply. A line break motor protector is also provided which is particularly well suited for use with two phase motors. Additionally, in order to increase reliability, circuitry is also provided for directly connecting the two phase motor to the single phase power supply in such a manner so as to enable the two phase motor to be operated directly from the single phase supply in the event of failure of the two phase power supply.

23 Claims, 4 Drawing Figures

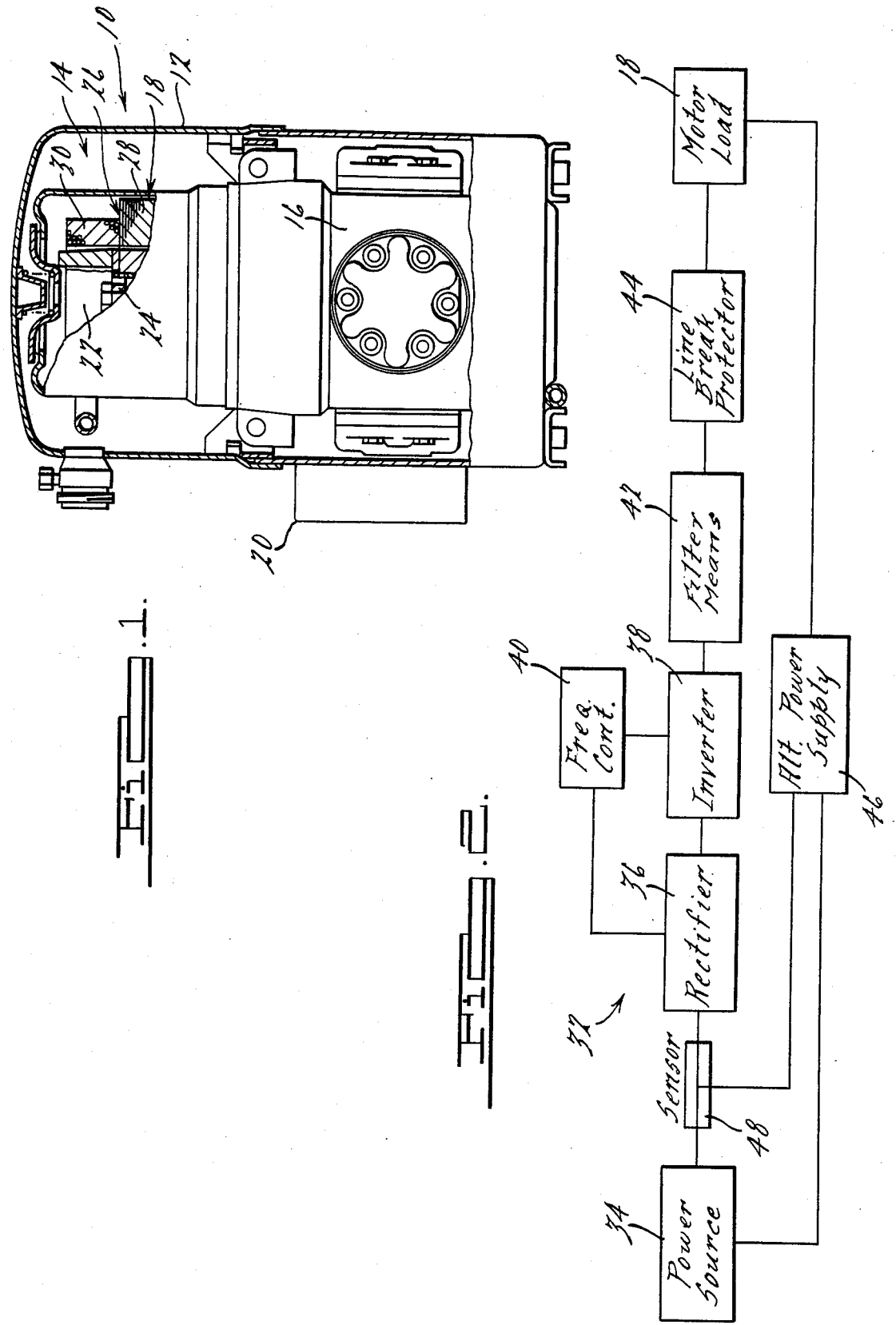

VARIABLE SPEED REFRIGERATION COMPRESSOR

This application is a continuation-in-part of application Ser. No. 347,459 entitled "Variable Speed Refrigeration Compressor" filed Feb. 11, 1982, now abandoned which claims priority on the basis of Patent Cooperation Treaty application Ser. No. U.S. 80/00722 filed June 12, 1980.

BACKGROUND AND SUMMARY OF THE INVENTION

The present invention relates generally to refrigeration compressors and more specifically to variable speed refrigeration compressors hving power supplies associated therewith which are designed to vary the frequency of the alternating current supplied to the driving motor whereby the operating speed of the compressor may be selected in accordance with the demand loading on the refrigeration equipment. As used herein the phrase "refrigeration" compressor is intended to include compressors usable to compress a refrigerant, including compressors used in both air conditioning and heat pump applications.

Refrigeration compressors are subject to widely varying demand cycles due to a variety of factors such as for example daily and seasonal fluctuation of ambient temperatures, human activity and presence within the refrigerated area, cyclic operation of other heat generating equipment, etc. Accordingly in order to assure satisfactory refrigeration of the area, refrigeration apparatus including the compressor means must be sized for particular applications to accommodate "worst case" conditions. That is to say that the equipment must have a large enough capacity to assure adequate refrigeration during the worst anticipated condition. Thus, under significantly more favorable operating conditions, which may be present during the major portion of the equipment operating life span, the refrigeration apparatus may have a significant extra capacity and therefore operate at reduced loading most of the time. Because maximum compressor motor operating efficiency is normally obtained only at full motor load, such reduced system load operation may result in less than optimum operating efficiency due to both motor characteristics, relatively short operating cycles and/or frequent starting and stopping of the compressor due to insufficient air circulation within the refrigerated spaces resulting from the shorter operating cycls. Such considerations become even more significant in compressors used for heat pump applications because the system load rating for heating must be up to approximately three times that required for air conditioning. Thus, the actual system operating load varies over a significantly greater range with the air conditioning load being significantly less than that of the heating load. Considering this fact along with the fact that a majority of the actual operation, even for heating, will be under loading conditions less than the full load rating of the equipment, the desirability of providing means by which the capacity of the refrigeration compressor can be modulated in accordance with the demand load can be readily appreciated.

A number of methods have previously been employed in order to modulate compressor capacity such as for example various valving and bypass arrangements which, while effective in modulating the associated system load, also reduce the overall operating efficiency of the refrigeration equipment thus resulting in higher operating costs. This may be particularly significant if refrigeration apparatus is operated at reduced loading for a significant portion of the time such as when heat pumps are being operated in a cooling mode. For example, in one form of compressor modulation, discharge gas is directed from the discharge line directly to the suction line bypassing the condenser and evaporator. Thus, the energy expanded in compression is lost. In another arrangement, particular cylinders may be continuously vented to the intake or suction manifold. While this avoids the expenditure of energy in compressing this gas, it nevertheless still results in reduced overall operating efficiency for a variety of reasons. For example, it is well known that electric motors generally have a maximum operating efficiency when operating at substantially full load. Thus, because the compressor motor must have a full load rating high enough to drive the compressor with all cylinders or compressing chambers full loaded, the reduction in loading due to such cylinder unloading techniques results in a lower motor operating efficiency and hence contributes significantly to lower overall system operating efficiency.

In order to overcome these disadvantages, two speed motors have been used to drive refrigeration compressors. In one form, two speed motors having separate stator windings have been used which include means for selectively energizing one or the other of the two stator windings. However, because of cost and size limitations, only two such windings can economically be provided and thus only two different operating speeds are obtained. In another form, a single stator winding is provided with an increased number of leads being brought out of the motor and connected to switch means adapted to interconnect the stator windings in different groupings, whereby the number of electricl poles produced by the stator winding is changed which results in different motor operating speeds. Typically, however, only two operating speeds may be obtained conveniently which speeds are related by a factor of two (i.e., the lower operating speed will be one-half of the higher operating speed).

While each of these approaches may offer some increase in operating efficiencies over the use of unloading techniques, they are of limited effectiveness because only two distinct operating speeds can be obtained. Unfortunately, demand loading on the refrigeration equipment and particularly heat pumps does not normally shift between two discrete points but rather will vary continuously over a rather broad spectrum. Thus, even the two speed refrigeration compressor motor may spend a significant portion of its operating time at reduced and hence less efficient loading. Therefore, it is desirable to provide a refrigeration compressor having a driving motor which may be operated over a broad range of speeds and also provide a relatively high level of operating efficiency at substantially all of the speeds of operation within the broad range.

The present invention overcomes these disadvantages in providing a refrigeration compressor which includes a two phase motor and an associated power supply which is operable to convert normally available single phase electrical power at a fixed frequency (generally 60 hertz) to two phase power of variable frequency. The use of a two phase motor offers substantially all the same advantages as does the use of a three phase motor over that of a single phase motor such as for example lower locked rotor currents, higher starting torque, lower full load currents, improved reliability due to elimination of the start and/or run capacitors which are required with single phase motors, and reduced stator stack size hence allowing use of smaller housings. The present invention, however, also provides means operative to connect the two phase motor directly to a single phase power source in the event of a failure of the two phase power supply. Thus, the present invention offers improved reliability over that of a three phase motor in that it can be operated directly on single phase power. This is not possible with three phase motors. Further cost savings may be realized both in terms of direct manufacturing and material costs for two phase motors over single or three phase motors and also savings are realized through the ability to use smaller size contactors for connecting to line due to lower locked rotor and running current ratings of the two phase motor. Additionally, costs associated with providing frequency conversion means are less for two phase than for three phase. Further, the present invention incorporates a unique and improved two phase motor design which substantially eliminates the third harmonic by way of selection and positioning of the winding configuration thereby affording substantial improvements in operating efficiencies. Thus, not only does the present invention provide a refrigeration compressor capable of operating at high motor efficiency over a relatively large demand spectrum but further offers improved reliability as well as allowing the advantages of three phase operation to be obtained in locations where only single phase power is available.

Also, in order to insure the two phase power supplied to the motor is of a generally sinusoidal shape, the present invention provides improved high energy filter means which operates to smooth the output waveform of the two phase power supply so as to more closely approximate a true sine wave. In one form, permanent magnet type filter means may be used which requires only relatively few turns of an electrical conductor wound upon a permanent magnet core, although other filter means may also be used.

The present invention also provides improved protection means particularly well suited for use with two phase motors which is equally effective in protecting both phases thereof against excessive current flow as well as affording protection against overheating of the motor. The protection means includes elements connected in series with each of the two phase windings of the motor either of which may operate independently of the other to disconnect the motor should abnormal operating conditions arise in one of the two phases. Additionally, because the protection means is of the line break type, and therefore does not require additional complex external circuitry, it offers relatively high reliability.

Additional advantages and features of the present invention will become apparent from the subsequent description and the appended claims taken in conjunction with the accompanying drawings.

BRIEF DESCRIPTION OF THE DRAWINGS

FIG. 1 is a side view of a refrigeration compressor in accordance with the present invention shown in elevtion with the outer housing shown in section and also having portions thereof broken away;

FIG. 2 is a block diagram of the two phase controlled frequency power supply for use in conjunction with the refrigeration compressor of FIG. 1, all in accordance with the present invention;

DESCRIPTION OF THE PREFERRED EMBODIMENT

Figure 3:
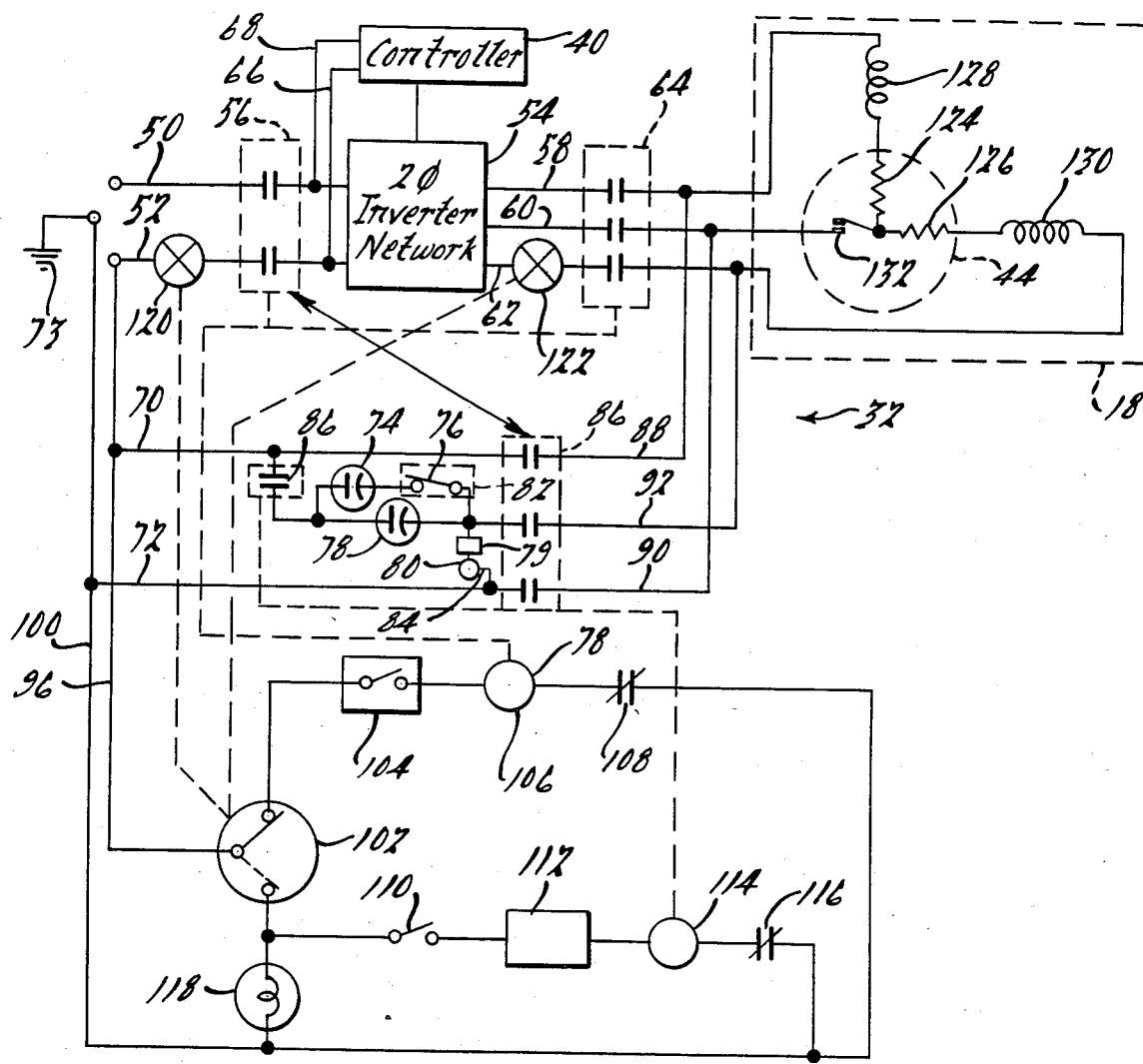
FIG. 3 is a schematic diagram of a preferred form of the two phase controlled frequency power supply in accordance with the present invention.

Referring now to the drawings and in particular to FIG. 1, there is shown a refrigeration compressor 10 of the hermetic type in accordance with the present invention which includes an outer shell 12 within which a motor compressor assembly 14 is supported. The motor compressor assembly 14 comprises compressor means 16 having a driving motor 18 secured thereto. As shown, compressor means 16 is in the form of a reciprocating piston type compressor although it should be noted that any other type of refrigeration compressor may be substituted therefor. An electrical box 20 is also provided secured to the outer surface of outer shell 12 which may be adapted to house the power supply system and associated apparatus for connecting the compressor motor to a source of electrical power.

Driving motor 18 is a two phase motor and includes a rotor 22 secured to a drive shaft 24 which is operative to drive compressor means 16 and a stator assembly 26 including a stator core 28 and stator windings 30, including both first and second phase windings. In the preferred form, stator windings 30 of driving motor 18 will be of the full pitch design and configured in such a manner so as to substantially reduce or eliminate at least portions of the harmonic distortion resulting therefrom and in particular the lower order harmonics as described in greater detail hereinafter. Also, the rotor may be of the squirrel cage design and may have the bars or windings thereof skewed slightly from a true axial direction so as to improve the single phase operation thereof. In a preferred form the rotor bars will be skewed approximately one stator slot.

A power supply system 32 in accordance with the present invention and operative to supply two phase power of variable frequency to driving motor 18 is shown in block diagram in FIG. 2. As shown therein, power supply system 32 is adapted to be connected to a source of conventional single phase 60 hertz electrical power as represented by block 34 which power is supplied to rectifier means 36. Rectifier means 36 in turn converts the alternating current into direct current which is supplied to a combination inverter and frequency converter means 38 which converts the direct current power to two phase alternating current having a controlled variable frequency. The actual frequency of the two phase alternating current is controlled by frequency control means 40 connected thereto which receives operating power from rectifier means 36. In operation, frequency control means may be designed for either manual adjustment or preferably automatic adjustment in response to one or a number of operating conditions.

Because inverter means 38 may produce a somewhat distorted waveform relative to a normal sinusoidal wave, which waveform most likely will approximate a square wave although under certain operating conditions other wave shapes may be obtained, it is fed through a high energy filter means 42 which may preferably be in the form of a permanent magnet type filter although other types of filter means may also be used. The permanent magnet filter means 42 preferably comprises a winding having a relatively small number of turns of an electrical conductor wound around a core structure fabricated from a permanently-magnetized material. Filter means 42 will not only assist in shaping the waveform so as to cause it to more closely approximate a true sine wave but will also substantially reduce or eliminate low order harmonics which may otherwise interfere with proper efficient operation of driving motor 18.

In order to provide protection against both excessive current and overheating of two phase driving motor 18, protection means 44 of the line break type is connected between the output filter means 42 and driving motor 18. The line break protection means is designed to be responsive to both excessive current flow as well as abnormal thermal conditions within the motor and therefore will preferably be located in close proximate relationship to stator windings 30 of driving motor 18.

One of the important advantages available with the use of a two phase motor over a three phase motor is that it can be operated from single phase power should an equipment failure occur. This is a particularly important advantage with motors used to power refrigeration equipment as loss of refrigeration could result in spoilage of goods of substantial value. Therefore, while the above described power supply system is capable of providing a reliable source of two phase alternating current of varying frequency, an emergency or back-up alternative supply means 46 is also included therewith. As shown diagrammatically in FIG. 2, alternate power supply means 46 is connected directly between the source of single phase alternating current 34 and two phase driving motor 18. Sensor means 48 is also provided being connected between the single phase power source 34 and rectifier means 36 which is responsive to abnormal current flow to rectifier means 36 and operates to signal alternative supply means 46 to both connect the single phase power source 34 to the motor as well as to disconnect the two phase power supply 32 therefrom. In order to prevent possible connection of both two phase power supply system 32 and the single phase power source 34 to the motor, suitable electrical and/or mechanical interlock means may be provided as described in greater detail below.

With reference now to FIG. 3, a particular and presently preferred embodiment of a power supply system in accordance with the present invention is shown in schematic form and will be described with reference thereto.

As shown therein, conductors 50 and 52 are adapted to be connected to a conventional and readily available source of single phase 60 hertz alternating current preferably of 220/230 volts and provide power to a two phase inverter network 54 which includes a full wave bridge rectifier means via two poles 56 of a five pole contactor of appropriate size relative to the requirements of driving motor 18. The two poles 56 of five pole contactor operate to supply power to two phase inverter network the output of which is connected via conductors 58, 60 and 62 and the remaining 3 poles 64 of the five pole contactor to two phase motor 18. Power is also supplied to controller 40 via conductors 66 and 68 from the output of poles 56.

Controller 40 will operate to control both the frequency as well as the cycling of the compressor in conjunction with and in response to the demands for cooling or refrigeration. Suitable control devices including appropriate sensors as required may be included herewith.

Alternative means are also provided whereby motor 18 may be connected directly between one leg 52 and ground 70 of the single phase power supply in the event of a power failure of the two phase network power supply. As shown a pair of conductors 70 and 72 are connected to the single phase power source between leg 52 and ground 73 so as to provide a source of single phase power at approximately one-half the voltage provided to the two phase inverter network. A start capacitor 74 and a normally closed relay switch 76 are connected in series with each other and in parallel with a suitable run capacitor 78 and across conductors 70 and 72. A suitable time delay means 79 and actuating coil 80 operable to open normally closed relay switch 76 are also provided connected in series between the start and run capacitors 74 and 78 and the associated relay contact 76 and conductor 72 via conductors 82 and 84 respectively.

In order to selectively connect motor 18 to the single phase power supply a four pole contact 86 is provided, three poles of which are connected on one side to conductors 70, 72 and 82 and on the other side to motor 18 via conductors 88, 90, 92 respectively. The fourth pole is connected between conductor 70 and the associated capacitors 74, 78, relay switch 76, time delay means 79 and actuating coil 80 so as to selectively control current flow thereto.

In order to control actuation of respective contactors 56, 64 and 86, suitable selective actuation circuitry is provided connected between leg 52 and ground 73 via conductors 96 and 100. A two position latching relay 102 is provided being connected to conductor 96. An actuating control switch 104, actuating coil 106 and normally closed microswitch 108 are also provided connected in series with each other and between a first position of the latching relay and conductor 100. A second switch 110, time delay means 112, actuating coil 114 and normally closed microswitch 116 are each connected in series between a second position of latching relay and conductor 100. Switch 110 is preferably in the form of a thermostatic switch to selectively control operation of the compressor 10 in response to cooling needs during single phase operation. A fault indicator light 118 may also be provided connected between the second position of the latching relay 102 and conductor 100. Suitable current sensors 120 and 122 are also provided connected in the input and output respectively of the two phase inverter network and operate to provide a signal to latching relay 102 in the event of abnormal current condition.

Under normal operating conditions, switch 104 will be closed in order to actuate the refrigeration system. Upon closing of switch 104, current will flow from leg 52 of the single phase supply through conductor 96 to latching relay 102 which will normally be in the first position as shown. Actuating coil 106 will then operate to close contacts 64 and 56 thereby connecting both motor 18 and the two phase inverter network 54 to the single phase power source. Thereafter control means 40 will operate to selectively cycle and control the frequency output and hence speed of motor 18 in accordance with the required cooling load.

In the event current sensors 120 or 122 sense an abnormal current flow (i.e. either excessive or no current flow) one or the other will operate to switch latching relay 102 from the first position as shown to a second position when current flow will be directed through switch 110, (assuming cooling is required and switch 110 is then closed) time delay means 112, actuating coil 114 and microswitch 116 as well as through fault indicator light 118. This will thus interrupt current flow to actuating coil 106 thereby causing contacts 56 and 64 to open and disconnect both the motor and supply from the two phase inverter network.

Time delay means 112 will be selected such as to insure a sufficient time delay to allow opening of contacts 56 and 64 before energization of actuating coil 114 which in turn will close contacts 86. Upon closing of contacts 86, the motor will be connected to the single phase power source and associated start and run capacitors for single phase operation. Time delay means 79 will operate to delay energization of coil 80 a sufficient time period to insure motor 18 has achieved approximately 75 percent of full speed operation whereupon actuating coil will effect opening of relay switch 76 thereby disconnecting start capacitor 74. Once the desired cooling has been achieved, switch 110 will open thereby de-energizing coil 114 and opening contacts 86 shutting down compressor 10. In the event additional cooling is required, switch 110 will then close and motor 18 will be again started and operated in a single phase mode.

In order to prevent possible simultaneous actuation of both contacts 64, 56 and 87, they will preferably be both mechanically and electrically interlocked in a suitable manner such as is well known in the art. By way of example, the electrical interlock may be accomplished by interconnecting normally closed microswitches 108 and 116 with actuating coils 114 and 106 respectively. Thus energization of coil 106 will effect opening of normally closed microswitch 116 thereby assuring actuating coil 114 cannot be energized prior to de-energization of coil 106. Normally closed microswitch 108 and coil 114 will also be interconnected and operate in a similar manner. It should also be noted that in order to assure the motor will not overheat during single phase operation, it may be desirable to lengthen the stator core slightly which may also contribute somewhat to improved motor operating efficiencies.

Referring once again to FIG. 3, protection means 44 as shown therein comprises a pair of heater elements 124 and 126 one being connected in series with respective of two phase windings 128 and 130 and a bimetallic contact carrying arm member 132. Heater elements 124 and 126 are substantially identical and are designed to heat bimetallic contact carrying arm 132 in response to current in excess of a predetermined magnitude to a sufficiently high temperature as to open the contact provided thereon to move out of engagement with its mating contact thereby breaking the motor circuit. Additionally, because the bimetallic arm is thermally responsive, it will operate independently of the heaters to open the motor circuit in response to an abnormal thermal condition within the windings which may result from other than abnormal current flow. The use of matched or substantially identical heater elements 124 and 126 in the protector makes it particularly well suited for use in a two phase motor as each heater is capable of responding to abnormal current conditions within the respective phase windings 128, 130 without regard to conditions in the other phase windings. However, the added benefit of overload protection is also obtained as a result of the combined heating effect of the two heater elements acting on the bimetallic arm. Additionally, protection means 44 will also operate to protect motor 18 while operating directly on single phase power.

It is therefore apparent that the present invention provides an improved refrigeration motor compressor in which a two phase motor is used to drive compressor means and is supplied with two phase power of variable frequency whereby the speed of the compressor may be controlled to accommodate the changing demand resulting from varying ambient conditions. Preferably, the two phase inverter network will be capable of varying the frequency of the two phase power from approximately 30 to 180 hertz and will adjust the voltage applied to the motor proportionally whereby a substantial range of operational capacity may be achieved. Also, because the full load rating of the motor will vary directly with the speed of the motor, the motor will continue to operate at or near its full load rating even when the refrigeration equipment is being operated at substantially reduced loading. This is an important advantage because electric motors characteristically have a maximum operating efficiency at or very close to full load and suffer reduced efficiency at reduced load. Thus, the motor of the present invention will continue to operate at or near maximum efficiency throughout the frequency range of operation because the full load rating thereof will be reduced as the speed of the motor is reduced by lowering the frequency of the power supplied thereto.

The present invention also incorporates a two phase motor having a unique winding configuration which offers substantial improvements in operating efficiencies by reducng the level of harmonic distortions and in particular the lower level harmonics heretofore present in such two phase machines to levels commonly achieved in three phase motors.

Figure 4:
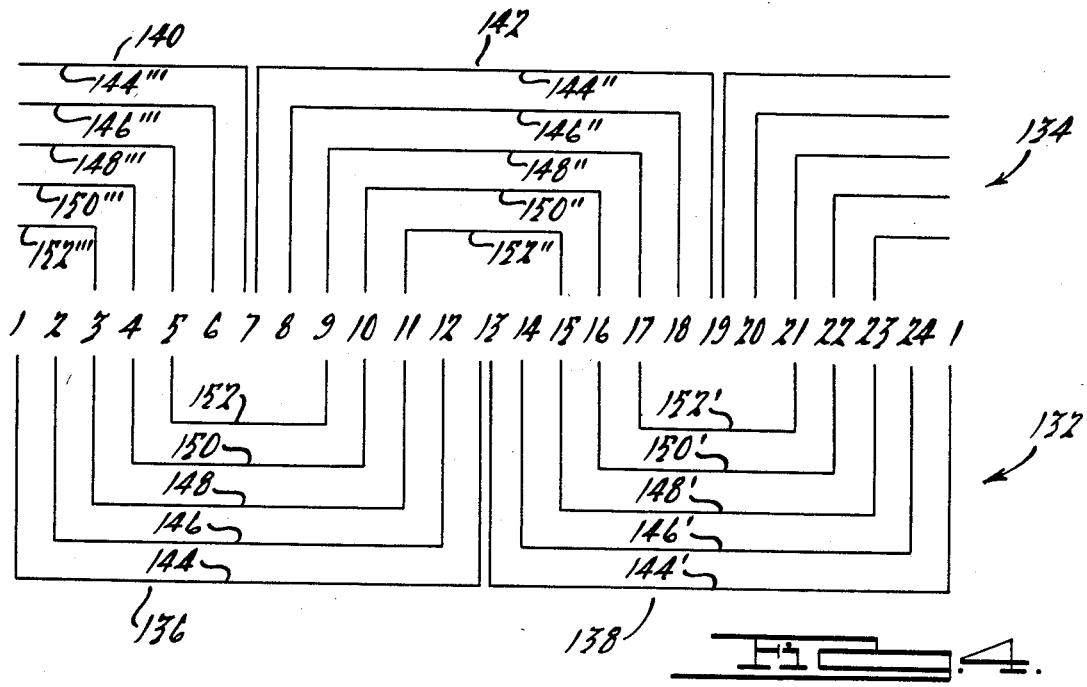
FIG. 4 is a schematic diagram illustrating a preferred winding configuration for a two phase motor in accordance with the present invention.

Referring now to FIG. 4, there is illustrated in schematic form a presently preferred two phase motor stator winding arrangement, one set of phase windings 132 being illustrated below the number line (which represents the individual slots of a stator core and the other phase windings 134 being illustrated above this line. As shown, this winding diagram is for a two phase motor having a stator core comprising a total of 24 slots. In the preferred embodiment these slots will be of three different sizes relative to each other, the specific size thereof being selected in accordance with the wire size and number of turns required for the particular output requirements. In the design illustrated which employs a preferred full pitch winding, slots, 1, 12, 13 and 24 are of the smallest size with slots 2, 11, 14 and 23 being of an intermediate size and slots 3-10 and 15-22 being of the largest size. By so varying the slot size in the present invention, a reasonable level of slot fill is achieved with the winding configuration illustrated.

In the illustrated preferred embodiment, each phase 132, 134 (which are of course displaced 90 degrees from each other) is provided with two poles 136, 138, 140, 142 respectively with each pole having a total of five coils 144, 146, 148, 150, 152. Because the five coils forming each of the four poles are substantially identical, they are indicated by like numbers primed and only a single set of coils will be described. In this embodiment, outer and innermost coils 144 and 152 are each comprised of five turns each whereas coils 146, 148, and 150 are each comprised of 10 turns.

Turning now to an analysis of this preferred winding configuration, it may be shown that both the third and ninth harmonics have been reduced to zero thereby providing the two phase motor of the present invention with the harmonic distortion characteristics comparable with that achieved in three phase designs. The ratio of the amplitude of a higher level harmonic $A_n$ to the fundamental component $A_1$ for a two phase motor may be expressed in terms of a ratio of the winding or distribution factors for those harmonics as follows:

$$A_n/A_1 = K_{wn}/NK_{w1}$$

where n is an integer corresponding to the particular level harmonic and wherein:

$$K_{wn} = \frac{A_x \mathrm{SIN}\left(n\theta \frac{B_x}{C}\right)}{D}$$

with $A_x$ = the number of conductor turns for coil x
$\theta$ = phase angle or 90 degrees for a two phase motor
$B_x$ = number of slots spanned by coil x
$C$ = number of slots per pole
$D$ = total number of turns per pole Applying this formula to the described embodiment for the third harmonic we have:

$$K_{w3} = \frac{5\,\mathrm{SIN}\left(270\frac{12}{12}\right) + 10\,\mathrm{SIN}\left(270\frac{10}{12}\right) + 10\,\mathrm{SIN}\left(270\frac{8}{12}\right) + 10\,\mathrm{SIN}\left(270\frac{6}{12}\right) + 5\,\mathrm{SIN}\left(270\frac{4}{12}\right)}{5 + 10 + 10 + 10 + 5}$$

When the above equation is solved, we find that $K_{w3}$ is equal to 0 thus showing us that the third harmonic has been eliminated by employing the above described winding configuration. Thus, it may now be appreciated that by proper selection of the number of turns in each coil, the number of slots to be spanned by each coil and the number of slots per pole in relationship to each other, the resulting third harmonic in the two phase motor may be reduced to 0. It should also be noted that in this particular configuration, the ninth harmonic which while still significant is of less importance than the third is also reduced to 0.

Thus, as is now apparent, the present invention also offers a substantially improved two phase motor design which may be advantageously employed in conjunction with the variable frequency inverter network to achieve efficieint wide ranging capacity modulation in a refrigeration compressor. Further, the present invention also offers the advantage of an auxiliary powering means in the event the variable frequency inverter network encounters a failure. It should also be noted that the use of a two phase motor not only offers the backup protection of being able to operate on single phase power but because only two phases are employed, the cost associated with the inverter network may be proportionally less.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A refrigerant compression system comprising:
   compressor means;
   two phase motor means drivingly connected to said compressor means, said motor means including first and second phase stator windings;
   supply means for supplying non-two phase alternating current;
   conversion means for converting said non-two phase alternating current to two phase alternating current; and
   alternate power supply means operative to connect said two phase motor means directly to said supply means and to interconnect the stator windings of said two phase motor so as to enable said motor to operate directly from said supply means in response to a failure of said conversion means whereby said motor means may continue to drive said compressor means.

2. A refrigerant compression system as set forth in claim 1 wherein said alternate power supply further includes control means including sensor means connected between said source of non-two phase alternating current and said conversion means, said sensor means being operative to sense an abnormal condition in said conversion means and to provide a signal to actuating means, said actuating means being operative to close said switch means whereby said motor means will be connected directly to said supply means.

3. A refrigerant compression system as set forth in claim 2 wherein said two phase motor means comprises a stator assembly and a rotor rotatably supported within said stator assembly, said stator assembly being operative to generate a rotating magnetic field for rotatably driving said rotor, said stator assembly comprising a plurality of laminations and first and second phase windings disposed within slots provided in said laminations, each of said first and second phase windings including at least two poles with each pole being defined by a plurality of coils each consisting of a predetermined number of turns of an electrical conductor and spanning a predetermined number of said slots, the improvement wherein the number of coils per pole, the number of slots spanned by each pole and by respective coils defining each of said poles and the number of said turns are selected such that $$\frac{A_x \mathrm{SIN}\left(270\frac{B_x}{C}\right)}{D} = 0$$

wherein
$A_x$ = the number of conductor turns for each coil x
$B_x$ = the number of slots spanned by each coil x
$C$ = the number of slots for each pole
$D$ = the total number of turns per pole
whereby said third harmonic is reduced to 0.

4. A refrigerant compression system as set forth in claim 2 further comprising disconnect means for disconnecting said supply means from said conversion means in response to operation of said actuating means.

5. A refrigerant compression system comprising;
compressor means;
two phase motor means drivingly connected to said compressor means, said motor means including first and second phase stator windings;
supply means for supplying non-two phase alternating current;
conversion means for converting said non-two phase alternating current to two phase alternating current; and
alternate power supply means operative to connect said two phase motor means directly to said supply means in response to a failure of said conversion means whereby said motor means may continue to drive said compressor means,
said alternate power supply means including switch means and capacitor means, said switch means being operative to connect said first and second phase windings in parallel relationship with said supply means and to connect said capacitor in series with one of said first and second phase windings.

6. An improved two phase motor providing reduced harmonic distortion and having a stator assembly and a rotor rotatably supported within said stator assembly, said stator assembly being operative to generate a rotating magnetic field for rotatably driving said rotor, said stator assembly comprising a plurality of laminations and first and second phase windings disposed within slots provided in said laminations, each of said first and second phase windings including at least two poles with each pole being defined by a plurality of coils each consisting of a predetermined number of turns of an electrical conductor and spanning a predetermined number of said slots, the improvement wherein the number of coils per pole, the number of slots spanned by each pole and by respective coils defining each of said poles and the number of said turns are selected such that $$\Sigma \frac{A_x \mathrm{SIN}\left(N90 \frac{B_x}{C}\right)}{D} = 0$$

wherein
$A_x$ = the number of conductor turns for each coil x
$B_x$ = the number of slots spannd by each coil x
$C$ = the number of slots for each pole
$D$ = the total number of turns per pole
and N is equal to the harmonic level to be eliminated.

7. An improved two phase motor as set forth in claim 6 wherein said first and second phase windings are full pitch windings and the number of turns included in the innermost coil of each pole is equal to the number of turns included in the outermost coil and successive inner and outer coils also have equal number of turns.

8. An improved two phase motor as set forth in claim 6 wherein the cross sectional area of said slots is non-uniform.

9. An improved two phase motor as set forth in claim 6 wherein N is equal to 3 and said third harmonic is equal to zero.

10. A refrigerant compression system comprising:
compressor means;
two phase motor means drivingly connected to said compressor means;
input means for inputting a non two phase alternating supply current;
conversion means for converting said supply current to two phase alternating current;
condition responsive control means for controlling the frequency of said two phase alternating current in response to a condition;
means for conducting said two phase controlled frequency alternating current to said motor means for driving said motor means and hence said compressor means at a speed proportional to said frequency, whereby the output of said compressor means is controlled in response to said condition; and
alternate power supply means connected between said non two phase alternating supply current and said two phase motor for interconnecting the stator windings of said two phase motor so as to enable said motor to operate from said non-two phase alternating supply current and connecting said two phase motor directly to said non two phase alternating supply current in the event of a failure of said conversion means.

11. A refrigerant compression system as set forth in claim 10 wherein said conducting means include filter means connected between said conversion means and said motor means for shaping the output waveform of said two phase alternating current.

12. A refrigerant compression system as set forth in claim 11 wherein said filter means comprises a core member having an electrical conductor wound thereon.

13. A refrigerant compression system as set forth in claim 12 wherein said core member is a permanent magnet.

14. A refrigerant compression system as set forth in claim 10 further comprising protection means connected between said conducting means and said motor means, said protection means being operative to interrupt flow of said two phase controlled frequency alternating current to said motor means in response to abnormal operating conditions.

15. A refrigerant compression system as set forth in claim 14 wherein said protection means is of the line break type.

16. A refrigerant compression system as set forth in claim 15 wherein said motor means includes first and second stator phase windings and said protection means comprises a first heater element connected in series with said first phase winding, a second heater element connected in series with said second phase winding and a pair of matable contacts, one of said contacts being electrically connected to said first and second heaters, the other of said contacts being electrically connected to said conducting means, either of said first and second heaters being operative in response to excessive current flow therethrough to move said one contact out of engagement with the other contact.

17. A refrigerant compression system as set forth in claim 16 wherein said first and second heaters are substantially identical.

18. A refrigerant compression system comprising:
compressor means;
two phase motor means drivingly connected to said compressor means;
input means for inputting a single phase alternating supply current;
conversion means for converting said supply current to two phase alternating current;

condition responsive control means for controlling the frequency of said two phase alternating current in response to a condition;

means for conducting said two phase controlled frequency alternating current to said motor means for driving said motor means and hence said compressor means at a speed proportional to said frequency, whereby the output of said compressor means is controlled in response to said condition; and alternate power supply means connected between said single phase alternating supply current and said two phase motor for connecting said two phase motor directly to said single phase alternating supply current in the event of failure of said conversion means;

said input means including switch means for connecting said single phase power to said conversion means and said alternate power supply is electrically interlocked with said switch means whereby actuation of said alternate power supply will operate to open said switch means thereby disconnecting said conversion means from said single phase power source.

19. A refrigerant compression system as set forth in claim 18 wherein said motor means includes first and second phase windings and said alternate power supply includes capacitor means and connecting switch means for connecting said capacitor in series with one of said first and second phase windings and for connecting said first and second phase windings in parallel relationship across said single phase alternating current source.

20. A refrigerant compression system as set forth in claim 19 wherein said alternate power supply further includes sensor means associated with said input means for sensing an abnormal condition and actuating said alternate power supply in response to said sensed abnormal condition.

21. A refrigerant compression system as set forth in claim 20 wherein said sensor is responsive to excessive current flow through said input means.

22. A refrigerant compression system comprising: compressor means;

two phase motor means drivingly connected to said compressor means;

said two phase motor including a stator assembly and a rotor rotatably supported within said stator assembly, said stator assembly being operative to generate a rotating magnetic field for rotatably driving said rotor, said stator assembly comprising a plurality of laminations and first and second phase windings disposed within slots provided in said laminations, each of said first and second phase windings including at least two poles with each pole being defined by a plurality of coils each consisting of a predetermined number of turns of an electrical conductor and spanning a predetermined number of said slots, the improvement wherein the number of coils per pole, the number of slots spanned by each pole and by respective coils defining each of said poles and the number of said turns are such that $$\frac{A_x \mathrm{SIN}\left(N90 \frac{B_x}{C}\right)}{D} = 0$$

wherein
- $A_x$ = the number of conductor turns for each coil x
- $B_x$ = the number of slots spanned by each coil x
- $C$ = the number of slots for each pole
- $D$ = the total number of turns per pole and n is equal to the harmonic level to be eliminated;

input means for inputting a non two phase alternating supply current;

conversion means for converting said supply current to two phase alternating current;

condition responsive control means for controlling the frequency of said two phase alternating current in response to a condition; and means for conducting said two phase controlled frequency alternating current to said motor means for driving said motor means and hence said compressor means at a speed proportional to said frequency, whereby the output of said compressor means is controlled in response to said condition.

23. A refrigerant compression system comprising:
compressor means;

two phase motor means drivingly connected to said compressor means and including first and second phase stator windings;

supply means for supplying non-two phase alternating current;

conversion means for converting said non-two phase alternating current to two phase alternating current;

adjustable control means connected to said conversion means for controlling the frequency of said two phase alternating current, whereby the frequency of said two phase alternating current may be adjusted in accordance with operating conditions so as to vary the speed of said motor means and hence said compressor means;

filter means connected between said conversion means and said motor means for shaping the waveform of each phase of said two phase alternating current;

protection means associated with said motor means including first current responsive means connected in series with said first stator winding, second current responsive means connected in series with said second stator winding and circuit interrupting means electrically connected to each of said first and second current responsive means, said first and second current responsive means being operative to actuate said circuit interrupting means in response to a sensed adverse condition whereby current flow to said motor means is interrupted; and alternate connecting means for connecting said two phase motor means directly to said supply means in response to a failure of said conversion means whereby said motor means may continue to drive said compressor means.

* * * * *